US012697953B2

(12) United States Patent
Canestri et al.

(10) Patent No.: US 12,697,953 B2
(45) Date of Patent: Aug. 4, 2026

(54) MOTOR VEHICLE AND A BRAKING CONTROL METHOD FOR THE MOTOR VEHICLE

(71) Applicant: FERRARI S.P.A., Modena (IT)

(72) Inventors: Jacopo Canestri, Modena (IT); Martino Cavanna, Modena (IT)

(73) Assignee: FERRARI S.P.A., Modena (IT)

( * ) Notice: Subject to any disclaimer, the term of this patent is extended or adjusted under 35 U.S.C. 154(b) by 447 days.

(21) Appl. No.: 18/470,502

(22) Filed: Sep. 20, 2023

(65) Prior Publication Data

US 2024/0101092 A1     Mar. 28, 2024

(30) Foreign Application Priority Data

Sep. 22, 2022     (IT) ........................ 102022000019416

(51) Int. Cl.
B60T 13/66          (2006.01)
(52) U.S. Cl.
CPC ....... B60T 13/662 (2013.01); B60T 2270/402 (2013.01)
(58) Field of Classification Search
CPC .......................... B60T 13/662; B60T 2270/402
USPC .......... 303/113.1–113.4, 114.1, 115.1, 115.2
See application file for complete search history.

(56) References Cited

U.S. PATENT DOCUMENTS 9,221,441 B2 * 12/2015 Strengert ................ B60T 7/042
9,925,965 B2 * 3/2018 Spoeri .................. B60T 13/161

FOREIGN PATENT DOCUMENTS

| DE | 1530681 A1 | 12/1969 |
| DE | 10057880 A1 | 11/2001 |
| DE | 10349664 A1 | 6/2005 |
| DE | 102018222754 A1 | 6/2020 |
| EP | 0869293 A1 | 10/1998 |
| EP | 3378712 A1 | 9/2018 |

OTHER PUBLICATIONS

Italian Search Report for Application No. 102022000019416, Filing Date: Sep. 22, 2022; Date of Mailing: May 5, 2023, 6 pages.

* cited by examiner

*Primary Examiner* — Christopher P Schwartz
(74) *Attorney, Agent, or Firm* — CANTOR COLBURN LLP

(57)          ABSTRACT

A motor vehicle with a first and a second wheel; a control member, which can be activated; a first and a second braking device, which can be operated by means of the control member; and a braking control system, which is connected to the control member and is provided with a first fluidic line and with a second fluidic line connected to the control member and to a first a first and a second chamber of the first braking device; a third fluidic line fluidically connected to one of the first and the second chamber; and a control valve, which can be moved between a first position, in which it connects the third fluidic line to the second fluidic line and isolates the second fluidic line from the second chamber; and a second position, in which it isolates the third fluidic line from the second fluidic line and connects the second fluidic line to the second chamber; and a control unit programmed to acquire an operating state of the control member and a plurality of operating parameters of the motor vehicle and to move the control valve from the second position to the first position for a limited amount of time.

13 Claims, 9 Drawing Sheets

MOTOR VEHICLE AND A BRAKING CONTROL METHOD FOR THE MOTOR VEHICLE

CROSS-REFERENCE TO RELATED APPLICATIONS

This patent application claims priority from Italian patent application no. 102022000019416 filed on Sep. 22, 2022, the entire disclosure of which is incorporated herein by reference.

TECHNICAL FIELD

The invention relates to a motor vehicle and to a braking control method for the motor vehicle.

BACKGROUND

Motor vehicles are known, which comprise an engine, for wheels and a braking system, which can be operated in order to exert braking torques upon the respective wheels and reduce the speed of the motor vehicle.

Known motor vehicles further comprise a control member, for example a brake pedal, which is designed to control the braking system and can be activated by the driver.

More in detail, the braking system comprises, for each wheel:

a brake caliper;

a disc, which can rotate with the wheel in an integral manner; and a fluidic line, where an operating liquid, for example oil, flows and which is fluidically connected to the control member;

Each brake caliper comprises, in turn:

a support body housing the relative brake disc;

a pair of pads, which are movable between respective rest positions, in which they are spaced apart from the relative brake disc, and respective operating positions, in which they come into contact with the relative brake disc and exert the braking torque upon the relative wheel; and a pair of chambers fluidically connected to the relative fluidic line and accommodating, on the inside, the respective pads so that they can move between the corresponding rest and operating positions.

The activation of the control member determines an increase in the pressure of the operating liquid in the fluidic lines and a consequent increase in the pressure of the chambers housing the brake calipers. This happens when the operating liquid is substantially incompressible and, therefore, is capable of transmitting pressure in an effective manner and substantially without losses.

Said pressure increase determines the movement of the pads from the relative rest positions to the relative operating positions.

Top-of-the-range motor vehicles further comprise:

a vehicle stability control system, which is operatively connected to the braking system and can be operated, in given operating situations of the motor vehicle, to have the braking system exert braking torques, if necessary even different ones, upon the respective wheels, so as to ensure a desired degree of stability of the motor vehicle;

an anti-lock system, commonly known as ABS, which is also operatively connected to the braking system and can be operated so as to limit the braking torque acting upon the wheels and prevent the wheels from locking; and a control unit receiving, as an input, a plurality of signals representative of the operating situation of the motor vehicle and programmed to operate the stability control system and/or the anti-lock system in given operating situations.

More in detail, the stability control system of the motor vehicle is configured so as to have the braking system exert the braking torques to a suitable extent upon one or more wheels even when the control member is deactivated, so as to stabilize the motor vehicle.

On the contrary, the anti-lock system is configured so as to limit the aforesaid braking torques when the control member is active, namely during a motor vehicle braking phase requested by the driver, in order to avoid the risk of locking the motor vehicle.

More in detail, the stability control system of the motor vehicle comprises a hydraulic pump, which can be operated by the control unit, and respective first control valves, which are interposed along respective fluidic lines.

The control unit is programmed to move one or more first control vales to respective first operating positions, in which they allow the operating liquid pressurized by the hydraulic pump to reach the relative chambers through the respective fluidic lines, so as to exert respective braking torques upon the wheels.

The anti-lock system comprises, for each wheel, a relative second proportional valve, which is selectively movable by the control unit to a relative operating position, in which it is interposed along the relative fluidic line and reduces, proportionally to the command given by the control unit, the pressure of the operating liquid, so as to accordingly reduce the braking torque.

A prolonged activation of the braking system determines an increase in the temperature of the operating liquid.

More precisely, the quantity of operating liquid housed in the chambers of the calipers is heated by the heat generated by the braking action exerted by the pads upon the relative discs.

The Applicant found out that, under particularly severe prolonged braking conditions, there is the risk that said quantity of operating liquid reaches the corresponding boiling temperature and, consequently, bubbles are formed in the operating liquid.

Under these conditions, the mixture of operating liquid and bubbles present in the fluidic lines would no longer be completely incompressible, thus evidently jeopardizing the braking torque exerted upon the wheels following the activation of the control member and, hence, the overall safety of the motor vehicle.

This risk especially applies to the front wheels, which have to bear the largest part of the weight of the vehicle while braking.

Therefore, the risk of overheating of the operating liquid needs to be reduced.

Furthermore, said risk has to be reduced with not active intervention by the driver.

Finally, said risk has to be reduced without changing the configuration of the stability control system and of the anti-lock system normally present in the motor vehicle.

SUMMARY

The object of the invention is to provide a motor vehicle, which is capable of fulfilling at least one of the needs discussed above.

The aforesaid object is reached by the invention, as it relates to a motor vehicle as defined in claim 1.

Furthermore, the invention also relates to a braking control method for a motor vehicle as set forth in claim 13.

BRIEF DESCRIPTION OF THE DRAWINGS

The invention will be best understood upon perusal of the following detailed description of two preferred embodiments, which are provided by way of non-limiting example, with reference to the accompanying drawings, wherein.

DESCRIPTION OF EMBODIMENTS

Figure 1:
FIG. 1 is a perspective view of a motor vehicle according to a first embodiment of the invention.

With reference to the FIGS. 1 to 8 attached hereto, number 1 indicates a motor vehicle comprising a body 2 defining a passenger compartment and a plurality of wheels FL, RL, FR, RR.

Hereinafter, expressions such as "at the top", "at the bottom", "at the front", "at the back", "left", "right" and others similar to them are used with reference to a normal moving direction of the motor vehicle 1.

Furthermore, it is possible to define:

a longitudinal axis X integral to the motor vehicle 1, which, in use, is horizontal and parallel to a normal moving direction of the motor vehicle 1;

a transverse axis X integral to the vehicle 1, which, in use, is horizontal and orthogonal to the axis X; and an axis Z integral to the vehicle 1, which, in use, is vertical and orthogonal to the axes X, Y.

In particular, the wheels FL and FR are the left and right front wheels of the motor vehicle 1, respectively.

The wheels RL and RR are the left and right rear wheels of the motor vehicle 1, respectively.

The motor vehicle 1 further comprises, in a known manner, which is only schematically shown in the accompanying figures:

an engine 6, which is designed to generate a torque exerted upon the wheels FL, RL, FR, RR;

a brake pedal 7, which can be operated by the driver in order to exert braking torques upon the respective wheels FL, RL, FR, RR; and an accelerator pedal 8, which can be operated by the driver in order to adjust the torque generated by the engine 6.

In particular, the pedal 7 normally is in a deactivated operating state and can be switched to an active operating state by the driver.

The motor vehicle 1 further comprises:

a braking control system 10 operatively connected to the pedal 7 and to the wheels FL, FR, RR, RL; and a plurality of braking devices 11, 12, 13, 14 associated with respective wheels FR, RL, RR, FL.

Each device 11, 12, 13, 14 comprises, in turn (FIG. 3):

a body 20;

a disc 21, which can rotate angularly to a relative wheel FR, RL, RR, FL and is housed in the body 20;

a pair of pads 22 housed inside the body 20 and movable, following the activation of the pedal 7, between respective neutral position, in which they are spaced apart from the relative disc 21, and respective operating positions, in which they are pressed against the disc 21 so as to exert a respective braking torque upon the relative wheel FR, RL, RR, FL.

The body 20 of each device 11, 12, 13, 14 comprises, in turn;

an inlet 27, through which an incompressible operating liquid, for example oil, is fed;

a pair of chambers 23, 24, 26, 25, which house, in a fluid-tight manner, the relative pads 22 and are fluidically connected to the respective inlet 27; and a pair of drains 31, 32, 33, 34 closed by respective caps 35, 36, 37, 38 and fluidically connected to the relative chambers 23, 24, 25, 26.

The chambers 23, 24, 26, 25 of each device 11, 12, 13, 14 are fluidically connected to one another.

In particular, the chambers 23, 24, 25, 26 extend on opposite sides of the relative pads 22, which are opposite one another with respect to the relative discs 21.

In this way, the pressure existing in the chambers 23, 24, 25, 26 exerts a pair of equal thrusts upon the relative pads 22 directed towards the relative disc 21.

The system 10 is designed to operate the braking devices 11 so as to:

exert respective braking torques upon the wheels FL, FR, RL, RR following the movement of the brake pedal 7 to the active operating state;

limit the braking torques exerted upon the wheels FL, FR, RL, RR following the activation of the brake pedal 7, so as to prevent the wheels FL, FR, RL, RR from locking, thus carrying out the function of a so-called ABS;

exert suitable braking torques upon one or more wheels FL, FR, RL, RR when the pedal 7 is in the deactivated operating state and in case of skid of the motor vehicle 1, so as to stabilize the attitude of the motor vehicle 1, thus carrying out the function of a so-called ESP or VDC.

Figure 2:
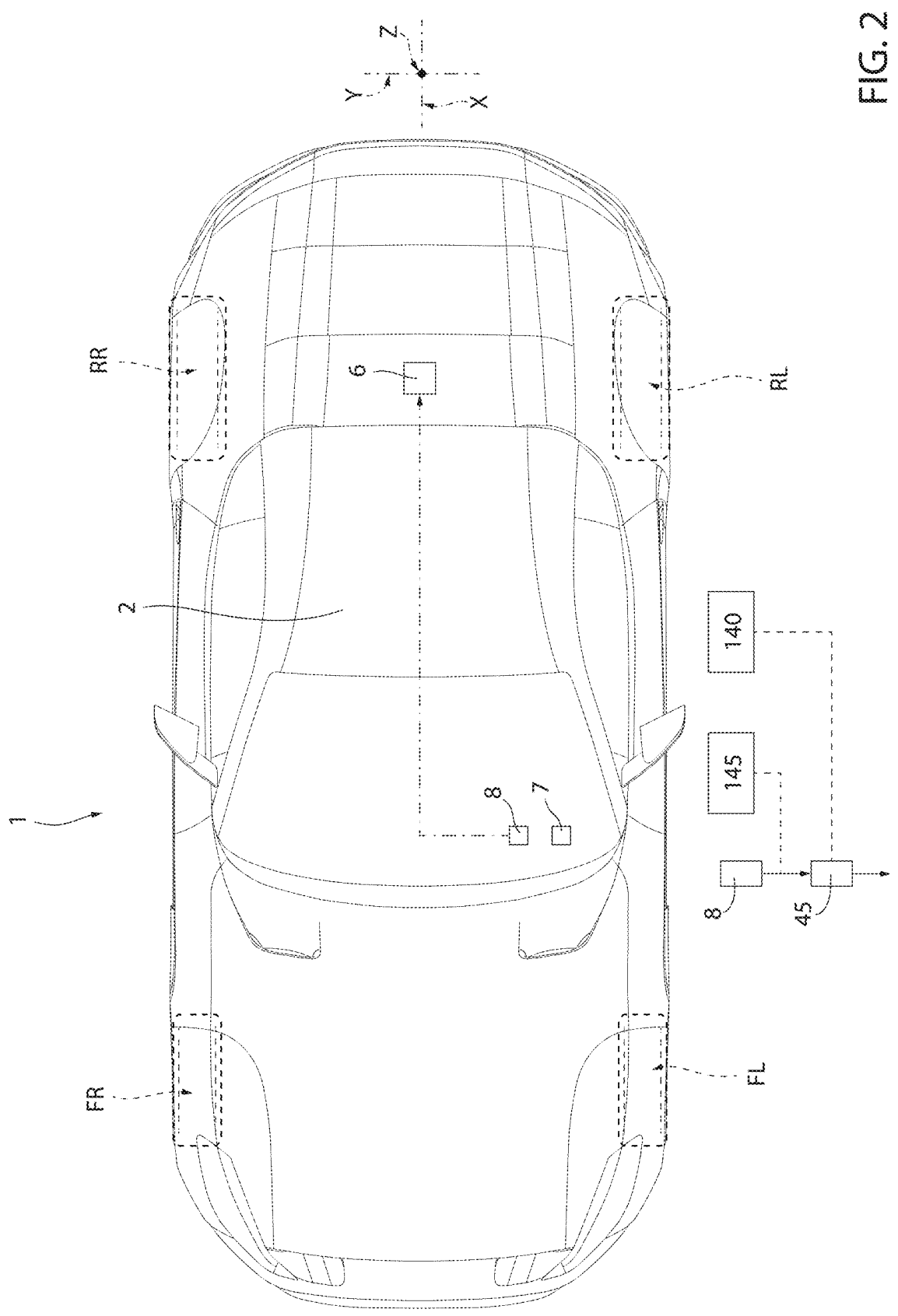
FIG. 2 is a view from the top of the motor vehicle of FIG. 1.

With reference to FIGS. 2 a 4, the system 10 comprises:

a control unit 45 (schematically shown in FIG. 2);

a tank, which is filled with an incompressible operating liquid, for example oil, is operatively connected to the pedal 7 and is provided with a pair of deliveries MC1, MC2;

a pair of fluidic lines 50, 51 extending between respective deliveries MC1, MC2 and respective inlets 27 of the bodies 20 of the devices 11, 14;

a pair of control valves USV1, USV2 interposed along the fluidic lines 50, 51; and a pair of control valves FREV, FLEV interposed along the fluidic lines 50, 51 in a position fluidically interposed between the respective control valves USV1, USV2 and the inlets 27 of the bodies 20 of the respective devices 11, 14.

Each fluidic line 50, 51 further comprises, moving from the relative delivery MC1, MC2 towards the relative inlet 27 of the devices 11, 14:

a section (52, 53) fluidically interposed between the relative delivery MC1, MC2 and the relative control valve USV1, USV2;

a section 54, 55;

a section 56, 57; and a section 58, 59 fluidically interposed between the relative control valve FREV, FLEV and the relative inlet 27 of the devices 11, 12.

In particular, the section 56, 57 is fluidically interposed between the respective section 54, 55 and the relative control valve FREV, FLEV.

Each fluidic line 50; 51 further comprises a segment 120, 121 interposed between the relative sections 54, 56; 55, 57.

Each control valve USV1, USV2, FREV, FLEV can be moved by the control unit 45 between:

a relative open position, in which it allows the operating liquid to flow along the relative fluidic line 50, 51; and a relative closed position, in which it prevents the operating liquid from flowing along the relative fluidic line 50, 51.

The system 10 further comprises:

a pair of fluidic lines 60, 61, each extending between a relative section 56, 57 of a fluidic line 50, 51 and the relative inlet 27 of the devices 13, 12;

a pair of control valves RLEV, RREV interposed along the respective fluidic lines 60, 61.

Each fluidic line 60, 61 further comprises a relative section 64, 65 interposed between the relative control valve RLEV, RREV and the inlet 27 of the relative braking device 12, 13.

Each control valve RLEV, RREV can be moved by the control unit 45 between:

a relative open position, in which it allows the operating liquid to flow along the relative fluidic line 60, 61; and a relative closed position, in which it prevents the operating liquid from flowing along the relative fluidic line 60, 61.

The system 10 further comprises:

a motor M controlled by the control unit 45;

a pair of groups of hydraulic pumps sRP1, sRP2, which can be operated by the motor M and have respective suction sections 71, 72 and respective delivery sections 73, 74;

a pair of fluidic lines 80, 81, each extending from a relative delivery MC1, MC2 to a corresponding suction section 71, 72 of the groups of hydraulic pumps sRP1, sRP2;

a pair of control valves HSV1, HSV2 interposed along respective fluidic lines 80, 81; and a pair of fluidic lines 90, 91, each extending between a relative delivery section 73, 74 and a relative section 54, 55 of a corresponding fluidic line 50, 51.

Each control valve HSV1, HSV2 can be moved by the control unit 45 between:

a relative open position, in which it allows the operating liquid to flow along the relative fluidic line 80, 81; and a relative closed position, in which it prevents the operating liquid from flowing along the relative fluidic line 80, 81.

The system 10 further comprises:

a tank A1;

a fluidic line 100 extending between the section 64 of the fluidic line 60 and the tank A1;

a fluidic line 101 extending between the section 58 of the fluidic line 50 and the tank A1; and a pair of control valves RLAV, FRAV interposed along respective fluidic lines 100, 101 and controlled by the control unit 45.

The system 10 finally comprises:

a tank A2;

a fluidic line 105 extending between the section 65 of the fluidic line 60 and the tank A2;

a fluidic line 106 extending between the section 59 of the fluidic line 50 and the tank A2; and a pair of control valves RRAV, FLAV interposed along respective fluidic lines 105, 106 and controlled by the control unit 45.

The system 10 further comprises:

a pair of fluidic lines 111, 112 extending between respective tanks A1, A2 and respective suction sections 71, 72 of corresponding pumps sRP1, sRP2; and a pair of non-return valves 113, 114 interposed along the fluidic lines 111, 112 and configured to allow the operating liquid to only flow from the relative tank A1, A2 towards the corresponding suction section 71, 72 and not in the opposite direction.

The fluidic lines 50, 51 further define a pair of segments 130, 131, each extending between a relative fluidic line 100, 101 and the relative chambers 24, 26.

Each control RLAV, FRAV; RRAV, FLAV can be moved by the control unit 45 between:

a plurality of relative open positions, in which it allows the a corresponding operating liquid flow rate to flow along the relative fluidic line 100, 101; 105, 106; and a relative closed position, in which it prevents the operating liquid from flowing along the relative fluidic line 100, 101; 105, 106.

In the specific case shown herein, the control valves HSV1, HSV2, RLEV, RREV, FLEV, FREV are ON-OFF valves, namely they are only movable between the relative open position and the relative closed position.

The control valves RLAV, FRAY; RRAV, FLAV permit the flow of an operating liquid flow rate associated with the relative degree of opening.

The system 10 further comprises:

a pressure sensor 185 arranged so as to detect the pressure existing in the area of the delivery MC1; and a pair of pressure sensors 190, 191 arranged so as to detect the pressures existing along respective fluidic lines 101, 106.

The motor vehicle 1 further comprises:

a plurality of sensors 140 (only schematically shown in FIG. 2) designed to generate respective first signals associated with the angular speeds of relative wheels FR, FL, RR, RL; and a sensor 145 (only schematically shown in FIG. 2, as well) designed to generate a second signal associated with the degree of activation of the accelerator pedal 8.

The system 10 advantageously comprises:

a fluidic line 150 connected to the chamber 23; and a control valve 151 selectively movable between:

a first position (FIG. 4), in which it fluidically connects the fluidic line 150 to the fluidic line 61 and fluidically isolates the fluidic line 61 from the chamber 23; and a second position (FIG. 3), in which it fluidically isolates the fluidic line 150 from the fluidic line 61 and fluidically connects the fluidic line 61 to the chamber 23;

the control unit 45 is programmed to:

acquire an active or deactivated operating state of the pedal 7 and a plurality of operating parameters of the motor vehicle 1; and hold the control valve 151 in the second position and move the control valve 151 to the first position for a limited amount of time, when the pedal 7 is in the deactivated operating state and when said first and second signals exceed respective predetermined threshold values.

More precisely, the fluidic line 150 directly extends between the chamber 23 and the fluidic line 61 without the interposition of any storage and/or expansion tank for the operating liquid.

The system 10 further comprises a non-return valve 152 fluidically interposed between the control valve 151 and the chamber 23, so that the operating liquid can only flow from the fluidic line 61 to the chamber 23 and not vice versa.

In particular, the fluidic line 61 ends in the area of one of the drains 31.

In the specific case shown herein, the control valve 151 is a three-way valve.

The control unit 45 is further programmed to move the control valve 151 to the first position, only if the ABS, ESC system are not enabled, as discussed more in detail below.

The system 10 further comprises (FIG. 5):

a pressure sensor 160 arranged along the fluidic line 61 in a position fluidically interposed between the control valve 151 and the chamber 23;

a pressure sensor 161 arranged along the fluidic line 150 in a position fluidically interposed between the control valve 151 and the non-return valve 152; and a pressure sensor 162 arranged along the fluidic line 50 in a position fluidically interposed between the chamber 23 and the valve FREV.

The system 10 finally comprises:

a temperature sensor 170 arranged along the fluidic line 150 in a position fluidically interposed between the non-return valve 152 and one of the drains 31 of the chamber 23; and a temperature sensor 171 arranged along the fluidic line 150 in the area of the other one of the drains 31 of the chamber 23.

Figure 3:
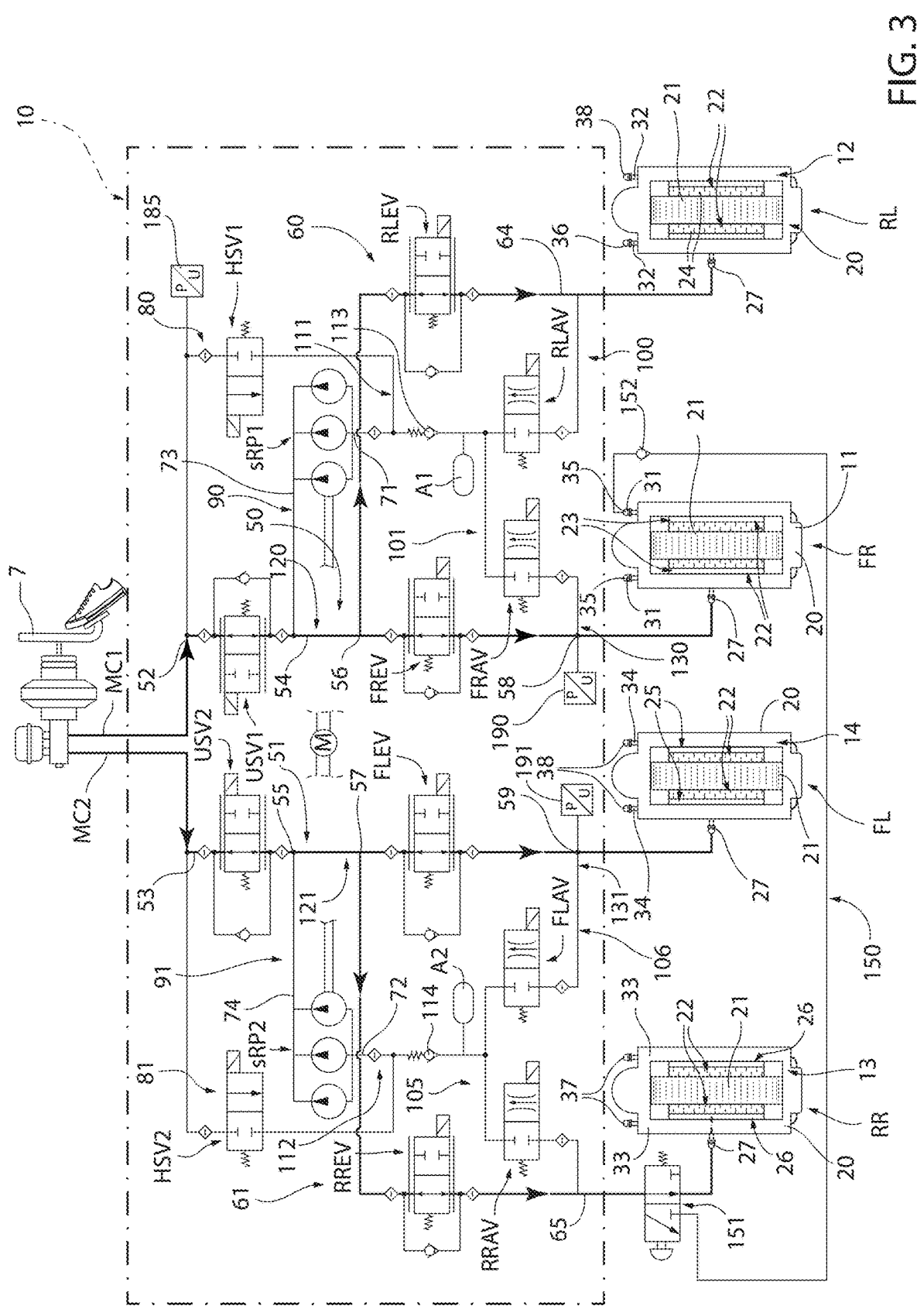
FIG. 3 schematically shows a braking control system of the motor vehicle of FIGS. 1 and 2 in a first operating condition.

The operation of the system 10 will now be described with reference to a vehicle braking condition set by the driver, namely a condition in which the pedal 7 is moved to the active operating state, shown in FIG. 3.

In the braking condition set by the driver, the control unit 45 holds the control valves USV1, USV2, FREV, RLEV, FLEV, RREV in the respective open positions.

The control unit 45 further holds the control valves HSV1, HSV2, FRAY, FLAY, RLAV, RRAV in the respective open positions and keeps the motor M deactivated.

Finally, the control unit 45 holds the control valve 151 in the second position, in which it prevents the operating liquid from flowing in the fluidic line 150.

Consequently, the command given by the driver determines, through the deliveries MC1, MC2, an increase in the pressure of the operating liquid in the fluidic lines 50, 51, 60, 61 and in the respective chambers 23, 25, 24, 26. The pressure reigning in the chambers 23, 25, 24, 26 determines the movement of the corresponding pads 22 to the respective operating positions, in which they exert the braking torques upon the discs 21 of the corresponding wheels FR, FL, RL, RR.

When the brake pedal 7 is released and moved to the deactivated operating state, the pressure of the operating liquid in the fluidic lines 50, 51, 60, 61 and in the respective chambers 23, 25, 24, 26 decreases. Consequently, the pads 22 go back to the relative neutral positions, in which they do not exert the respective braking torques upon the discs 21 of the corresponding wheels FR, FL, RL, RR.

The operation of the system 10 will now be described with reference to a condition in which the pedal 7 is active and the system 10 limits the braking torques exerted upon the wheels FR, FL, RL, RR in order to prevent the wheels FR, FL, RL, RR from locking, thus carrying out the function of a so-called ABS.

More in detail, the control unit 45 receives as an input, from the sensors 140, first signals representative of the fact that one or more of the wheels FR, FL, RL, RR is locked and processes the braking torque value exceeding the grip limit for the aforesaid one or more wheels FR, FL, RL, RR.

Furthermore, the control unit 45, starting from the configuration described above with reference to the braking condition set by the driver, moves the corresponding valve/s FLAY, FRAV, RLAV, RRAV to one of the respective open positions with degrees of opening associated with the quantities of braking torques exceeding the grip limit.

Consequently, depending on the degree of opening of the valves FLAY, FRAY, RLAV, RRAV, respective quantities of operating liquid flow from the fluidic lines 51, 50, 60, 61 into the respective fluidic lines 100, 101, 105, 106 and gather themselves in the corresponding tanks A1, A2.

This reduces the pressure in one or more of the chambers 23, 24, 25, 26 as well as the consequent braking torque exerted upon the respective wheels FL, FR, RL, RR until the wheels FL, FR, RL, RR are no longer locked.

The control unit 45 is further programmed to move the valves FLAY, FRAY, RLAV, RRAV back to the respective closed positions once the corresponding wheels FL, FR, RL, RR are no longer locked.

The operation of the system 10 will now be described with reference to a condition in which the pedal 7 is in the deactivated operating state and the system 10 generates suitable braking torques to be exerted upon the wheels FR, FL, RL, RR in order to stabilize the attitude of the motor vehicle 1 in case, for example, of a skid, this carrying out the function of a so-called ESP or VDC.

More in detail, the control unit 45 receives, as an input, a signal representative of an incorrect attitude of the motor vehicle 1 and generates suitable values of the braking torques to be exerted upon the respective wheels FL, FR, RR, RL in order to restore a condition of stability of the motor vehicle 1.

The control unit 45, in particular, moves the control valves USV1, USV2, FREV, FLEV to the respective closed positions and the control valves HSV1, HSV2 to the relative open positions and operates the motor M that activates the pumps sRP1, sRP2.

The control unit 45 further holds the valve 151 in the second position, the valves RLEV, RREV in the respective open positions and the valves FRAY, FLAY, RRAV, RLAV in the respective closed positions.

In this way, the operating liquid flows in the fluidic lines 80, 81 until it reaches the suction sections 71, 72 of the pumps sRP1, sRP2. The pumps sRP1, sRP2 increase the pressure of the operating liquid in the area of the respective delivery sections 73, 74.

The operating liquid with an increased pressure occupies the fluidic lines 90, 91, the respective segments 120, 121 and the fluidic lines 60, 61 until it invades and increases the pressure reigning in the chambers 24, 26 and exerts braking torques upon the respective wheels RL, RR.

Said braking torques stabilize the motor vehicle 1.

The operation of the system 10 will now be described with reference to a condition in which the pedal 7 is in the deactivated operating state and the control unit 45 controls the valve 151 so as to determine a recirculation of the operating liquid through the fluidic line 150.

Figure 4:
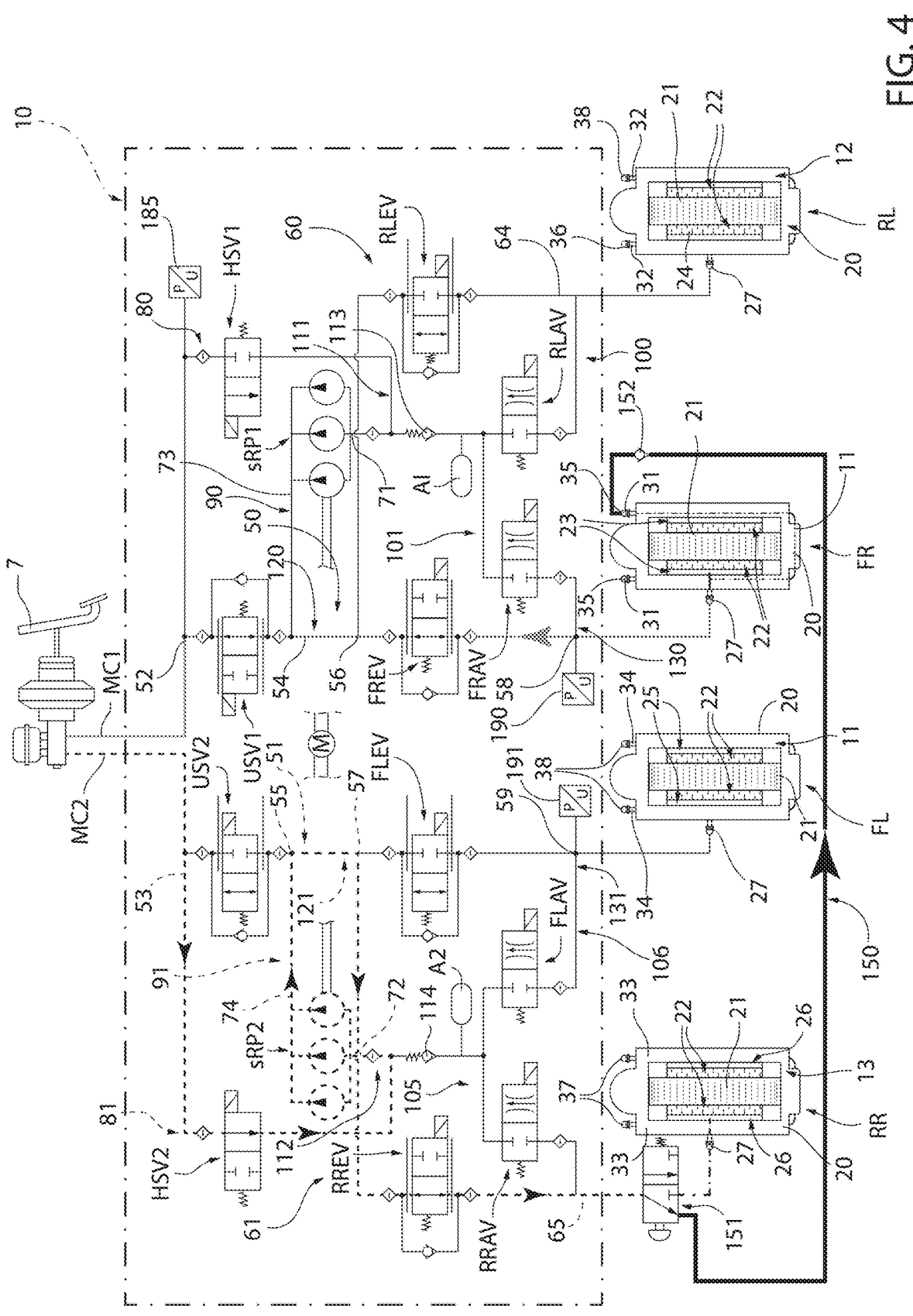
FIG. 4 schematically shows the braking control system of the motor vehicle of FIG. 3 in a second operating condition.
Figure 5:
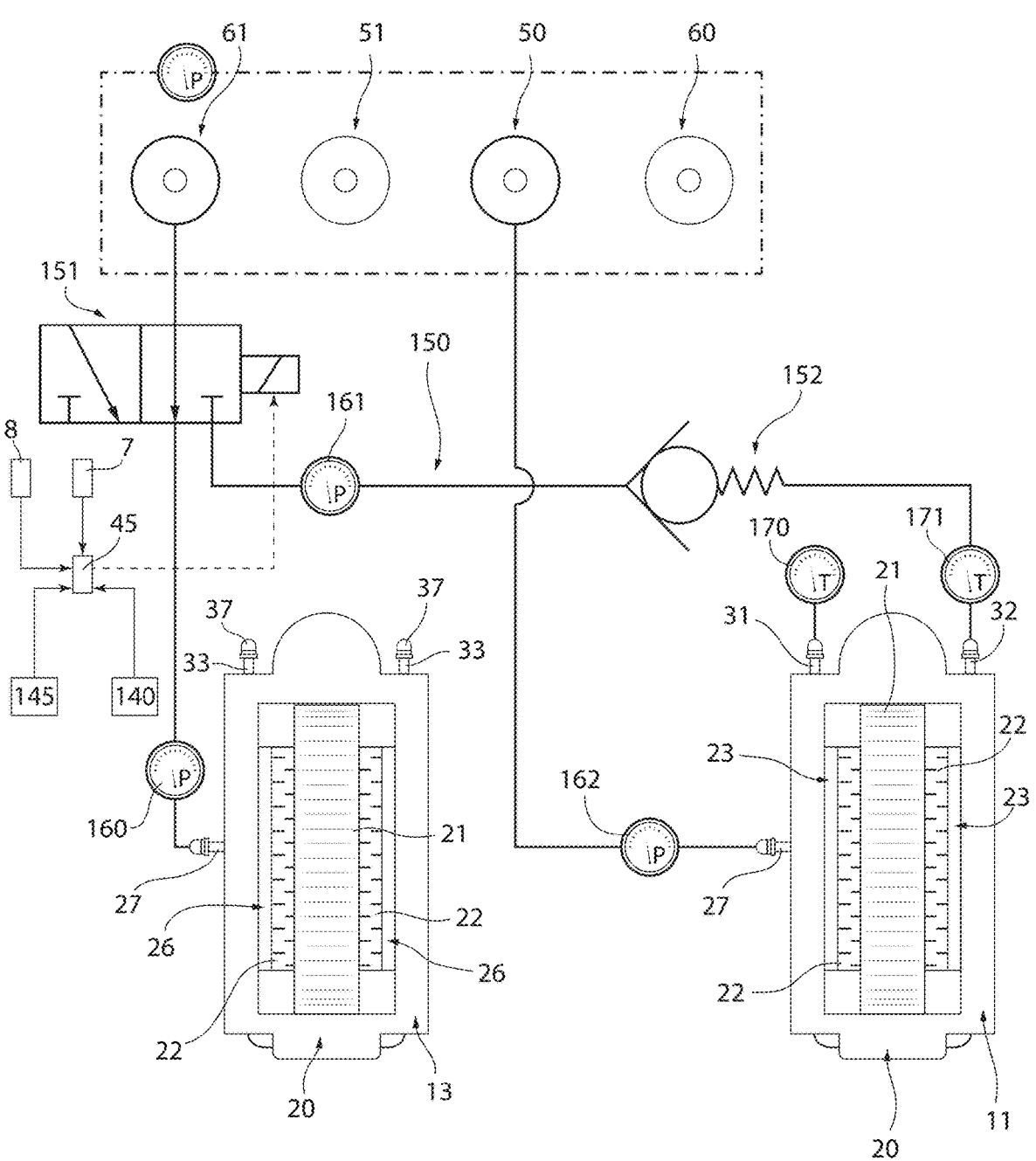
FIG. 5 schematically shows, on a larger scale, some details of the braking control system of FIGS. 3 and 4.
Figure 7:
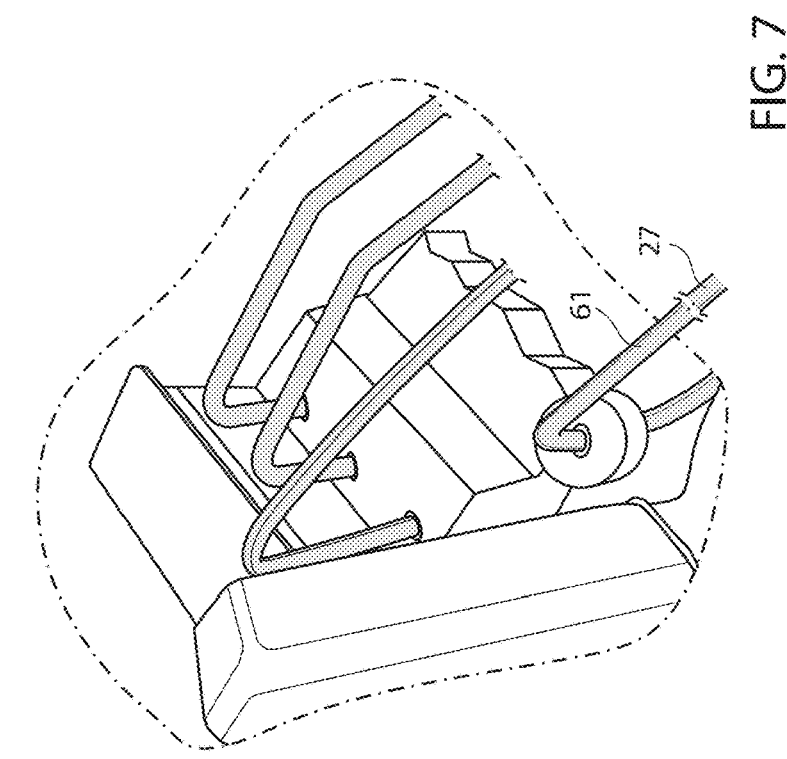
FIGS. 6 to 8 show respective further details of the braking control system of FIGS. 3 to 5 on a larger scale.
Figure 6:
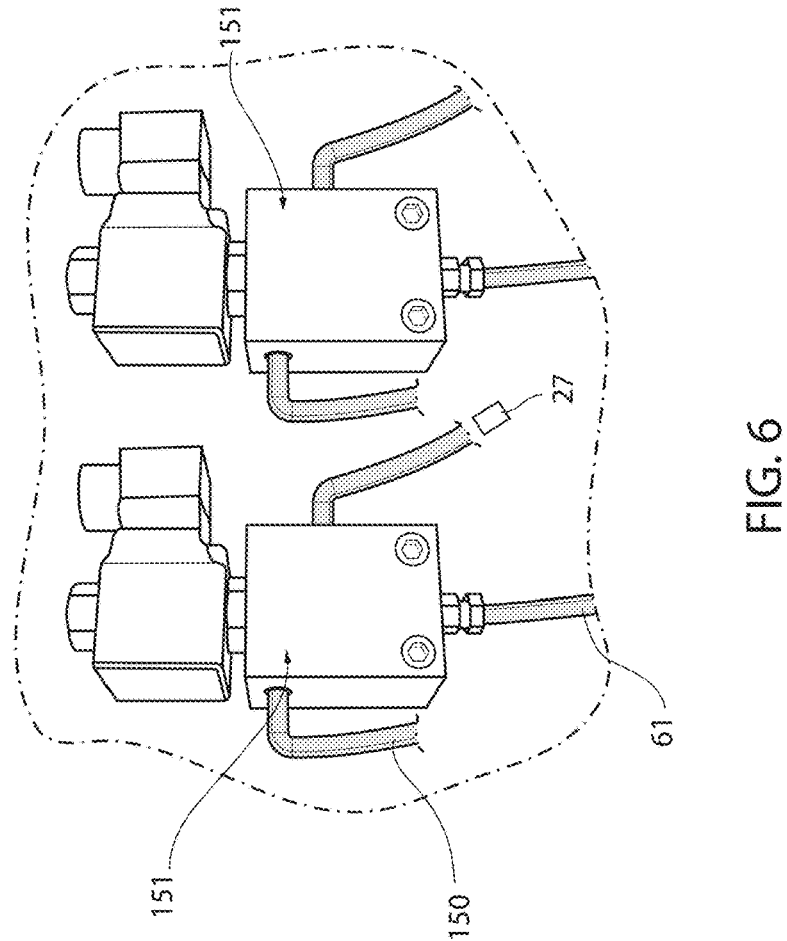
Figure 8:
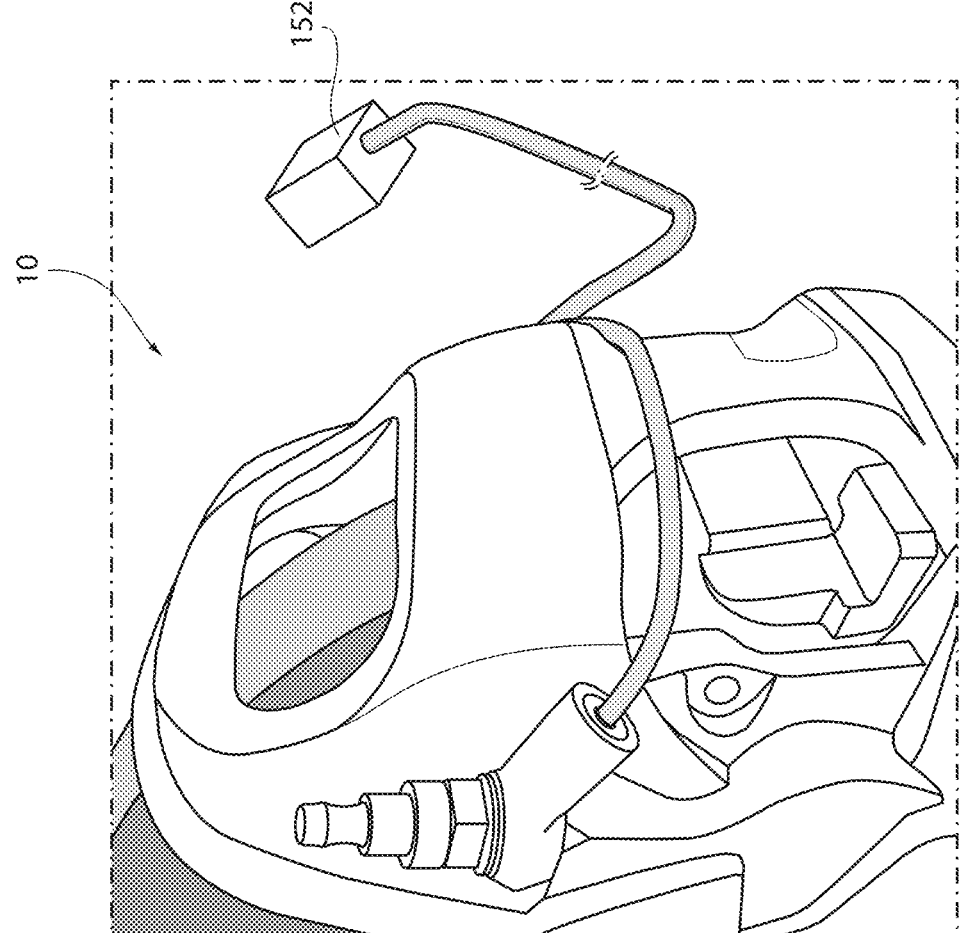

With reference to a condition shown in FIG. 4, in which the pedal 7 is in the deactivated operating state, the control unit 45 acquires, as in input:

from the sensors 140, first signals associated with angular speeds of the wheels FR, FL, RR, RL;

from the sensor 145, the second signal associated with the degree of activation of the pedal 8.

The control unit 45 further generates a third signal representative of the fact that the valves FRAV, FLAV, RRAV, RLAV are in the respective closed positions and that the motors M are deactivated, namely that the ABS and ESP functions are disabled.

The control unit 45 is programmed to move the valve 151 to the first position (FIG. 4) for the predetermined amount of time, when the first and second signals exceed a threshold value and, preferably, the third signal was generated.

The control unit 45 is further programmed to move, starting from the configuration described above with reference to the braking condition set by the driver, the valves USV2, FLEV to the respective closed positions, the valve HSV2 to the open position and to activate the motor M that operates the pump sRP2.

In this way, the operating liquid flows along the fluidic line 81 until it reaches the suction section 72 of the pump sRP2. The pump sRP2 increases the pressure of the operating liquid in the area of the delivery section 74. The operating liquid with an increased pressure occupies the fluidic line 91, the segment 121 and the fluidic line 61.

Subsequently, the operating liquid flows along the fluidic line 150 from the fluidic line 61 to the chamber 23, flowing through the drain 31 associated with the chamber 23.

The non-return valve 152 prevents the operating liquid from returning from the chamber 23 to the valve 151.

The operating liquid flows through the inlet 27 and flows back from the chamber 23 along the fluidic line 50 up to the delivery MC1.

In this way, the operating liquid can cool down along the fluidic line 150 by flowing away from the chamber 23, where the temperature is particularly high due to the braking torque previously exerted upon the wheel RR.

The control unit 45 is programmed to move the valve 151 back to the second position at the end of the predetermined amount of time.

Figure 9:
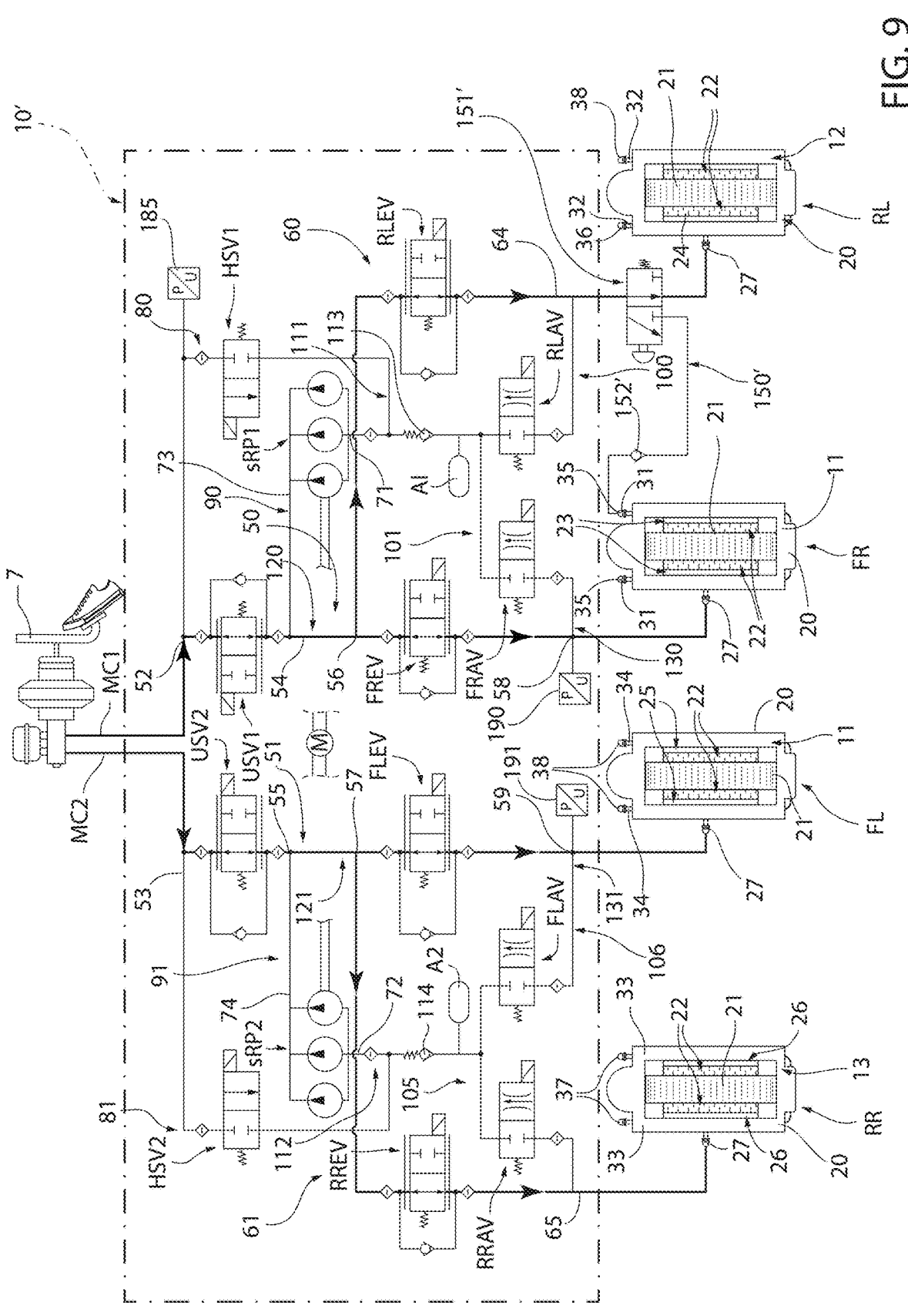
FIG. 9 schematically shows a braking control system of a motor vehicle according to a second embodiment of the invention and in a first operating condition.
Figure 10:
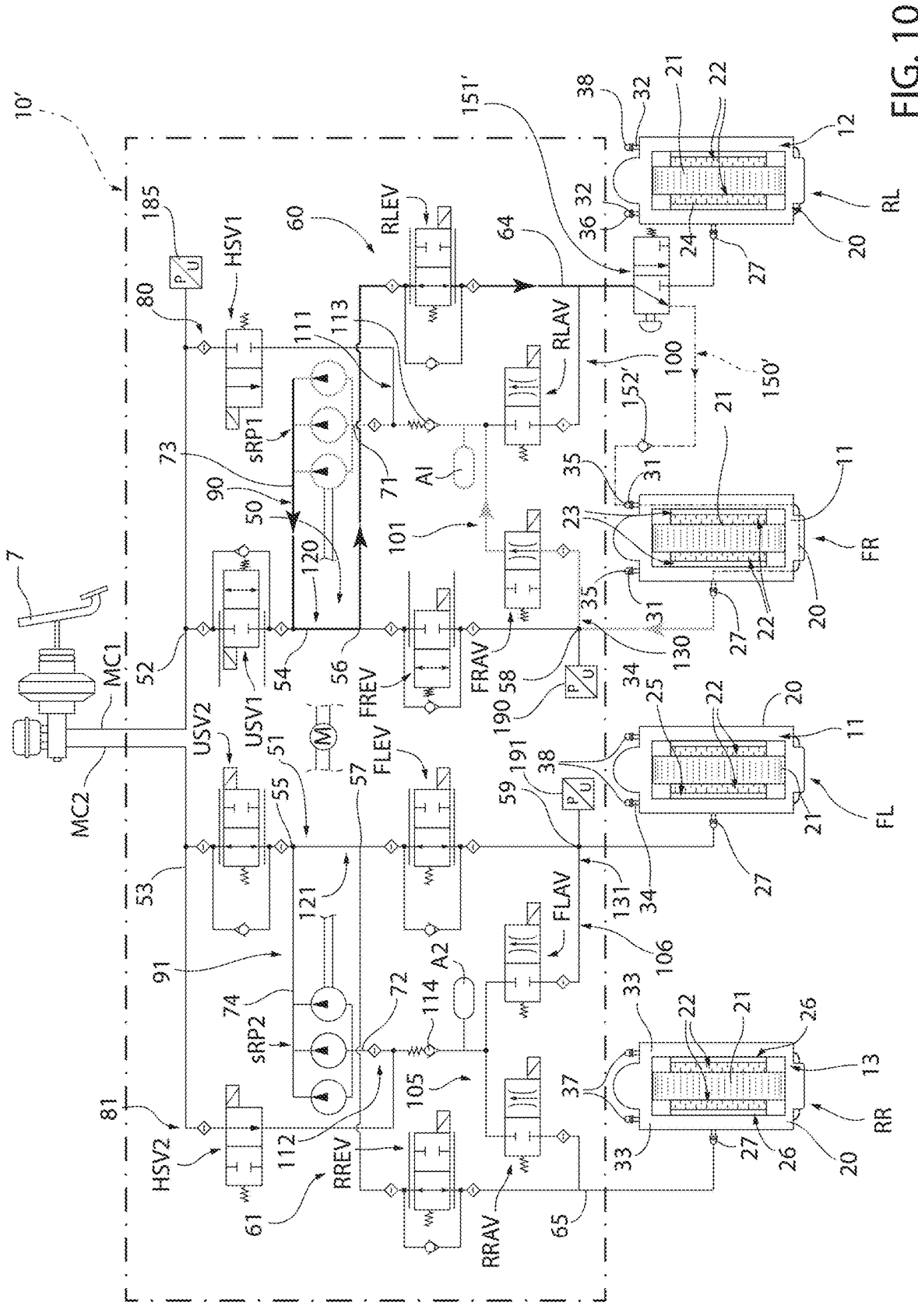
FIG. 10 schematically shows the braking control system of FIG. 9 in a second operating position.

With reference to FIG. 9, number 10' indicates a braking control system according to a second embodiment of the invention.

The system 10' is similar to the system 10 and will be described below only in those aspects that distinguish the former from the latter; similar or equivalent parts of the systems 10, 10' will be indicated, when possible, with the same reference numbers.

The difference between the system 10' and the system 10 lies in the fact that the fluidic line 150' extends between the fluidic line 60 and a drain 31 of the chamber 23.

More precisely, the fluidic line 150' directly extends between the chamber 23 and the fluidic line 60 without the interposition of any storage and/or expansion tank for the operating liquid.

The non return valve 152' is arranged on the fluidic line 150' in a position fluidically interposed between the control valve 151' and the chamber 23 and is configured to allow the operating liquid to only flow from the control valve 151' to the chamber 23 and not in the opposite direction.

The operation of the system 10' is described only in those aspect that distinguish it from the operation of the system 10.

In particular, the control unit 45' differs from the control unit 45 in that it is programmed, when the first and the second signals exceed a threshold value and, preferably, the third signal was generated, to:

move the valves USV1, FREV to the closed position;

move the valve FRAV to one of the relative open positions; and activate the motor M so as to operate the pump sRP1.

In this way, when the control valve 151' is in the first position, the operating liquid recirculates through the fluidic line 150, 150', the segment 130 of the fluidic line 50, the fluidic line 101, fills the tank A1 and reaches the suction section 71 of the pump sRP1 through the relative fluidic line 111.

The pump sRP1 increases the pressure of the operating liquid in the area of the delivery section 73.

The operating liquid with an increased pressure occupies the fluidic line 90, the segment 120 of the fluidic line 50 and the fluidic line 60 until it reaches the valve 151' arranged in the first position.

The disclosure above reveals evident advantages that can be obtained with the invention.

More in detail, the system 10, 10' comprises a fluidic line 150, 150', which is fluidically connected to the chambers 23 and can selectively be connected to the fluidic line 60, 60' through the activation of the control valve 151, 151', when the pedal 7 is in the deactivated operating state and the parameters exceed respective threshold values.

In this way, the operating liquid recirculates along the fluidic line 150', thus flowing away from the high-temperature chamber 23, for an amount of time that is sufficient for it to cool down.

This significantly reduces or even eliminates the risk of overheating and evaporation of the operating liquid, which remains incompressible even after the application of intense braking torques to the wheels FL, RL, FR, RR.

This ensures an ideal operation of the braking devices 11, 12, 13, 14 even under particularly severe use conditions.

The control unit 45, 45' ensures the movement of the control valve 151, 151' to the first position—and, hence, the consequent cooling of the operating liquid for a predetermined amount of time—in an automatic manner and when necessary with the pedal 7 in the deactivated operating state and the return of the control valve 151, 151' to the second position at the end of the predetermined amount of time.

The non-return valve 152, 152' ensures that the operating liquid does not return to the chamber 23 along the fluidic line 150, 150'.

The drains 31, 32, 33, 34 normally provided in the bodies 20 of the devices 11, 12, 13, 14 are used to fluidically connect the fluidic line 150, 150' to the chamber 23, thus reducing the need for further additional parts.

The hydraulic pumps sRP1, sRP2 and the valves HSV1, HSV2, USV1, USV2, FLEV, FREV, RLEV, RREV, FRAY, FLAY, RLAV, RRAV normally present in the system 10, 10' to carry out functions known as ABS and ESP or VDC are controlled by the control unit 45, 45' so as to permit the recirculation of the operating liquid through the fluidic line 150, 150' when the control valve 151, 151' is arranged in the first position, thus allowing the operating liquid to cool down using the already available layout of the control system 10, 10'.

Finally, the motor vehicle 1 and the method according to the invention can be subjected to changes and variations, which, though, do not go beyond the scope of protection set forth in the appended claims.

In particular, the fluidic line 150 could extend between the chamber 24 associated with the wheel FL and the fluidic line 60.

The fluidic line 150' could extend from the chamber 24 associated with the wheel FL to the fluidic line 61.

The invention claimed is:

1. A motor vehicle (1) comprising:
a first wheel (FR) and a second wheel (RL, RR);
a first control member (7), which can be operated so as to cause a braking action exerted upon said first wheel (FR) and second wheel (RR; RL);
a first braking device (11) and a second braking device (13, 12), which can be operated by means of said first control member (7) so as to exert a first braking torque upon said first wheel (FR) and a second braking torque upon said second wheel (RR, RL), respectively;
said first braking device (11) comprising:
a first body (20);
a first disc (21) angularly integral to the relative first wheel (FR) and housed inside said first body (20);
at least one first pad of pads (22) housed inside said first body (20) and movable between a neutral position, in which it is spaced apart from said first disc (21), and an operating position, in which it comes into contact with said first disc (21) so as to exert said first braking torque;
a first chamber (23) delimited by said first body (21) and housing, on the inside, said at least one first pad of pads (22);
said second braking device (13, 12) comprising:
a second body (20);
a second disc (21) angularly integral to the relative second wheel (RR, RL) and housed inside said second body (20);
at least one second pad of pads (22) housed inside said second body (20) and movable between a second neutral position, in which it is spaced apart from said second disc (21), and an operating position, in which it comes into contact with said second disc so as to exert said second braking torque;
a second chamber (26, 24) delimited by said second body (20) and housing, on the inside, said at least one second pad of pads (22);
said motor vehicle (1) comprising a braking control system (10, 10') operatively connected to said first control member (7);
said braking control system (10, 10') comprising, in turn:
a first fluidic line (50) fluidically connected to said first control member (7) and to said first chamber (23) and designed to house said operating liquid;
a second fluidic line (61, 60) fluidically connected, at least in an indirect manner, to said first control member (7) and to said second chamber (26, 24) and designed to house said operating liquid;
said first control member (7) being capable of being operated so as to raise the pressure of said operating liquid inside said first and second fluidic line (50, 51; 61, 60) and to move said at least one first pad of pads (22) from said first neutral position to said first operating position and said at least one second pad of pads (22) from said second neutral position to said second operating position;

characterized in that the braking control system (10, 10') further it comprises:
a third fluidic line (150, 150') fluidically connected to said first chamber (23); and
a first control valve (151, 151') selectively movable between:
a first position, in which it fluidically connects said third fluidic line (150, 150') to said second fluidic line (61, 60) and fluidically isolates said second fluidic line (61, 60) from said second chamber (26, 24);
a second position, in which it fluidically isolates said third fluidic line (150, 150') from said second fluidic line (61, 60) and fluidically connects said second fluidic line (61, 60) to the relative second chamber (26, 24); and
a control unit (45, 45') programmed to acquire an active or deactivated operating state of said first control member (7) and a plurality of operating parameters of said motor vehicle (1);
said control unit (45, 45') being further programmed to move said first control valve (151, 151') from said second position to said first position for a limited amount of time, when said first control member (7) is in the deactivated operating state and when said parameters exceed respective predetermined threshold values.

2. The motor vehicle according to claim 1, characterized in that said first control member (7) comprises, in turn, a first and a second delivery (MC1, MC2);
said motor vehicle (1) further comprising:
a third wheel (FL) and a fourth wheel (RR);
a third braking device (14) comprising a third chamber (25) and capable of being operated by means of said first control member (7) so as to exert a third braking torque upon said third wheel (FL); and
a fourth braking device (13) comprising a fourth chamber (26) and capable of being operated by means of said control member (7) so as to exert a fourth braking torque upon said fourth wheel (RR);
said braking control system (10, 10') comprising, in turn:
a fourth fluidic line (51) fluidically connected, in an indirect manner, to said first control member (7) and to said third chamber (25) and designed to house said operating liquid; and
a fifth fluidic line (61) fluidically connected, at least in an indirect manner, to said first control member (7) and to said fourth chamber (26) and designed to house said operating liquid;
each one of said first and fourth fluidic line (50, 51) comprising, in turn:
a relative second control valve (USV1, USV2);
a relative third control valve (FREV, FLEV) arranged in a position fluidically interposed between the relative second control valve (USV1, USV2) and the relative first chamber (23) or third chamber (25);
a relative first section (52, 53) fluidically interposed between the relative delivery (MC1, MC2) and the relative second control valve (USV1, USV2);
a relative second section (54, 55) and a relative third section (56, 57) fluidically interposed between the relative second control valve (USV1, USV2) and the relative third control valve (FREV, FLEV);
a relative fourth section (58, 59) fluidically interposed between the relative third control valve (FREV, FLEV) and the relative first or third chamber (23, 25); and a relative segment (120, 121) fluidically interposed between a relative third section (56, 57) and a corresponding fourth section (58, 59);

each third section (56, 57) being fluidically interposed between a relative second section (55, 56) and the corresponding third control valve (FREV, FLEV);

said second fluidic line (60) extending between said second chamber (24) and said third section (56) of said first fluidic line (50) or defining said fifth fluidic line (61);

said fifth fluidic line (61) extending between said fourth chamber (26) and said third section (57) of said fourth fluidic line (51);

each one of said second and fifth fluidic line (60, 61) further comprising:

a relative fourth control valve (RLEV, RREV) arranged in a position fluidically interposed between the relative third section (56, 57) of a relative first and fifth fluidic line (50, 51) and the corresponding second or fourth chamber (24, 26);

each one of said second and third control valve (USV1, USV2; FREV, FLEV) being selective movable between:

a relative second and third open position, in which they allow said operating liquid to flow along the corresponding first and fourth fluidic line (50, 51); and a relative second and third closed position, in which they prevent said operating liquid from flowing along the corresponding first and fourth fluidic line (50, 51);

each fourth control valve (RLEV, RREV) being selectively movable between a relative fourth open position, in which it allows said operating liquid to flow along the corresponding second or fifth fluidic line (60, 61), and a fourth closed position, in which it prevents said operating liquid from flowing along the corresponding second or fifth fluidic line (60, 61);

said braking control system (10, 10') further comprising:

a pair of hydraulic pumps (sRP1, sRP2), each capable of being selectively operated so as to move said operating liquid from a respective fifth suction section (71, 72) to a corresponding sixth delivery section (73, 74);

a pair of sixth fluidic lines (80, 81), each fluidically interposed between a respective second section (52, 53) of a respective first or fourth fluidic line (50, 51) and the respective fifth suction section (71, 72) of a corresponding hydraulic pump (sRP1, sRP2);

a pair of seventh fluidic lines (90, 91), each fluidically interposed between the relative sixth delivery section (73, 74) of a corresponding hydraulic pump (sRP1, sRP2) and said second section (54, 55) of a corresponding one of said first or fourth fluidic line (50, 51);

a pair of fifth control valves (HSV1, HSV2) interposed along respective sixth fluidic lines (80, 81);

each fifth control valve (HSV1, HSV2) being selectively movable between:

a relative fifth open position, in which it allows said operating liquid to flow along the corresponding sixth fluidic line (80, 81); and a relative fifth closed position, in which it prevents said operating liquid from flowing along the corresponding sixth fluidic line (80, 81);

said control unit (45, 45') being programmed to hold, in case of acquisition of an active operating state of said first control member (7) to place:

said first control valve (151, 151') in said second position;

said second, third and fourth control valve (USV1, USV2; FREV, FLEV; RLEV, RREV) in the respective second, third and fourth open position;

said fifth control valves (HSV1, HSV2) in the respective fifth closed positions; and said hydraulic pumps (sRP1, sRP2) deactivated.

3. The motor vehicle according to claim 2, characterized in that said braking control system (10, 10') further comprises:

a first tank (A1) associated with said first and fourth fluidic line (50, 60); and a second tank (A2) associated with said second and fifth fluidic line (51, 61);

a pair of eighth fluidic lines (101, 106) fluidically interposed between respective fourth sections (58, 59) of the corresponding first and fourth fluidic line (50, 51) and said respective first and second tank (A1, A2);

a pair of sixth control valves (FRAV, FLAV) interposed along respective eighth fluidic lines (101, 106) and selectively movable between respective sixth closed positions, in which they prevent said operating liquid from flowing along respective eighth fluidic lines (101, 106), and a plurality of respective sixth open positions, in which they allow respective quantities of operating liquid to flow along respective eight fluidic lines (101, 106);

a pair of ninth fluidic lines (100, 105) fluidically interposed between respective sixth sections (64, 65) of said corresponding second or fifth fluidic line (61, 6) and said respective first and second tank (A, A2); each sixth section (64, 65) being fluidically interposed between said fourth control valve (RREV, RLEV) and the relative second and fourth chamber (24, 26);

a pair of tenth proportional control valves (RLAV, RRAV) interposed along said ninth fluidic lines (100, 105) and each selectively movable between a relative seventh closed position, in which it prevents said operating liquid from flowing along the corresponding ninth fluidic line (100, 105), and a plurality of respective seventh open positions, in which they allow respective quantities of operating liquid to flow along the corresponding ninth fluidic line (105, 106); and a pair of tenth fluidic lines (111, 112) fluidically interposed between a respective first or second tank (A1, A2) and a respective suction section (71, 72) of a relative hydraulic pump (sRP1, SRP2);

said control unit (45, 45') being programmed to hold, in case of acquisition of said active operating state of said control member, said sixth and seventh control valves (FRAV, FLAV; RRAV, RLAV) in the respective sixth and seventh closed positions;

each sixth section (64, 65) being fluidically interposed between a respective fourth control valve (RREV, RLEV) and the corresponding second or fourth chamber (24, 26).

4. The motor vehicle according to claim 3, characterized in that said control unit (45) is programmed, in case of deactivated state of said first control member (7) and in case said parameters exceed respective predetermined threshold values, to:

move at least one second control valve (USV1) to said second closed position and a fourth control valve (FREV) to said fourth closed position;

hold at least one fifth control valve (HSV1) in the respective fifth closed position and at least one third control valve (RLEV) in said third open position;

activate at least one of said hydraulic pumps (sRP1), so as to suck said operating liquid from at least one sixth fluidic line (80) and deliver said compressed operating liquid into at least one seventh fluidic line (90), along at least one segment (120) of at least one first fluidic line (50) fluidically interposed between the respective second and third section (54, 56);

said operating liquid recirculating, in use, along said segment (120) of said first fluidic line (50), said eighth fluidic line (101), said tank (A1) and said tenth fluidic line (113) until it reaches said suction section (71) of a relative hydraulic pump (sRP1).

5. The motor vehicle according to claim 4, characterized in that said first wheel (FR) is front right wheel and said second wheel (RL) is a rear left wheel.

6. The motor vehicle according to claim 3, characterized in that said control unit (45, 45') is programmed, in case of acquisition of an active operating state of said first control member (7), to:

detect a condition of locking of at least one said first, second, third and fourth wheel (FR, RL, FL, RR);

move at least one of said sixth control valves (FLAV, RRAV) to the respective sixth open positions, in case said locking condition is detected, so as to convey part of said operating liquid from the corresponding first, second, fourth or fifth fluidic line (50, 51, 60, 61) towards said first or second tank (A1, A2) and reduce the braking torque acting upon the relative first, second, third or fourth wheel (FR, RL, FL, RR).

7. The motor vehicle according to claim 2, characterized in that said control unit (45) is programmed, in case of deactivated state of said first control member (7) and in case said parameters exceed respective predetermined threshold values, to:

move at least one second control valve and at least one fourth control valve (USV1, USV2; FREV, FLEV) to the respective second and fourth closed position;

move at least one corresponding fifth control valve (HSV1, HSV2) to the respective fifth open position;

activate at least a corresponding one (sRP1) of said hydraulic pumps (sRP1, sRP2), so as to suck said operating liquid from at least one corresponding sixth fluidic line (81) and deliver said compressed operating liquid into at least one corresponding seventh fluidic line (91), along at least one respective segment (121);

said operating liquid recirculating, in use, along said second fluidic line (61), said third fluidic line (150), said first chamber (23) and said first fluidic line (50) associated with said first chamber (23).

8. The motor vehicle according to claim 7, characterized in that said first wheel (FR) is front right wheel and said second wheel (RR) is a rear right wheel.

9. The motor vehicle according to claim 2, characterized in that said control unit (45, 45') is programmed to:

receive, as an input, a first signal representative of the condition of correct or wrong behaviour of said motor vehicle (1);

in case said first signal is representative of a correct behaviour of said motor vehicle (1) and in case said first control member (7) is deactivated, move said second and third control valve (USV1, USV2; FREV, FLEV) to the relative second and third closed position;

hold said first control valve (RLEV, RREV) in said fourth open position;

move said fifth control valve (HSV1, HSV2) to said fifth open position;

activate at least one of said hydraulic pumps (sRP1, sRP2) so as to suck said operating liquid from the relative suction section (71, 72) to the corresponding delivery section (73, 74); and move said first control valve (150, 150') to the relative second position.

10. The motor vehicle according to claim 1, characterized in that it comprises:

an engine (6) designed to apply respective torques to said first and second wheel (FR; RR, RL); and a second control member (8), which can be operated so as to adjust said engine (6);

said parameters comprising at least a driving speed of said motor vehicle (1) and a level of operation of said second control member (8);

said control unit (45, 45') being programmed to:

move said first control valve (150, 150') from said second position to said first position, when said driving speed exceeds a first threshold value and said level of operation of said first control member (8) exceeds a second threshold value; and move said second control valve (150, 150') back to said second position at the end of said amount of time.

11. The motor vehicle according to claim 1, characterized in that at least said first body (20) of said first braking device (11) comprises a first and a second draining opening (31) fluidically connected to said first chamber (23); said third fluidic line (150, 150') extending from said first control valve (151, 151') to said second draining opening (31).

12. The motor vehicle according to claim 1, characterized in that it comprises a non-return valve (152, 152') interposed along said third fluidic line (150, 150') between said first control valve (151, 151') and said first chamber (23) and configured so as to prevent said operating liquid from returning from said first chamber (23) towards said first control valve (151, 151').

13. A braking control method for a motor vehicle (1); said motor vehicle (1) comprising:

a first wheel (FR) and a second wheel (RL, RR);

a first control member (7), which can be operated so as to cause a braking action exerted upon said first wheel (FR) and second wheel (RR; RL);

a first braking device (11) and a second braking device (13, 12), which can be operated by means of said first control member (7) so as to exert a first braking torque upon said first wheel (FR) and a second braking torque upon said second wheel (RR, RL), respectively;

said first braking device (11) comprising:

a first body (20);

a first disc (21) angularly integral to the relative first wheel (FR) and housed inside said first body (20);

at least one first pad (22) housed inside said first body (20) and movable between a neutral position, in which it is spaced apart from said first disc (21), and an operating position, in which it comes into contact with said first disc (21) so as to exert said first braking torque;

a first chamber (23) delimited by said first body (21) and housing, on the inside, said at least one first pad (22);

said second braking device (13, 12) comprising:

a second body (20);

a second disc (21) angularly integral to the relative second wheel (RR, RL) and housed inside said second body (20);

at least one second pad (22) housed inside said second body (20) and movable between a second neutral position, in which it is spaced apart from said second disc (21), and an operating position, in which it comes into contact with said second disc so as to exert said second braking torque;

a second chamber (26, 24) delimited by said second body (20) and housing, on the inside, said at least one second pad (22);

said motor vehicle (1) comprising a braking control system (10, 10') operatively connected to said first control member (7);

said braking control system (10, 10') comprising, in turn:

a first fluidic line (50) fluidically connected to said first control member (7) and to said first chamber (23) and designed to house said operating liquid;

a second fluidic line (61, 60) fluidically connected, at least in an indirect manner, to said first control member (7) and to said second chamber (26, 24) and designed to house said operating liquid;

said method comprising the step of:

i) operating said first control member so as to raise the pressure of said operating liquid inside said first and second fluidic line (50, 51; 61, 60) and to move said first pad (22) from said first neutral position to said first operating position and said second pad (22) from said second neutral position to said second operating position;

characterized in that it comprises the further steps of:

ii) acquiring an operating state of said first control member (7) and a plurality of operating parameters of said motor vehicle (1);

iii) moving a first control valve between:

a first position, in which it fluidically connects a third fluidic line (150, 150') to said second fluidic line (61, 60) and fluidically isolates said second fluidic line (61, 60) from the relative second chamber (26, 24); and a second position, in which it fluidically isolates said third fluidic line (150, 150') from said second fluidic line (61, 60) and fluidically connects said second fluidic line (61, 60) to the relative second chamber (26, 24);

iv) moving said first control valve (151, 151') from said second position to said first position for a limited amount of time, when said first control member (7) is in the deactivated state and when said parameters exceed respective predetermined threshold values.

\*   \*   \*   \*   \*